United States Patent
Cuomo et al.

(10) Patent No.: US 7,073,027 B2
(45) Date of Patent: Jul. 4, 2006

(54) METHODS, SYSTEMS AND COMPUTER PROGRAM PRODUCTS FOR CONTROLLING CACHING OF DISTRIBUTED DATA

(75) Inventors: Gennaro A. Cuomo, Cary, NC (US); Brian K. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 10/618,209

(22) Filed: Jul. 11, 2003

(65) Prior Publication Data

US 2005/0010727 A1    Jan. 13, 2005

(51) Int. Cl.
*G06F 12/00* (2006.01)

(52) U.S. Cl. ...................... 711/118; 711/134
(58) Field of Classification Search ............. 711/113, 711/118, 133–136, 159–160
See application file for complete search history.

(56) References Cited

U.S. PATENT DOCUMENTS

| | | | | |
|---|---|---|---|---|
| 5,943,687 A | * | 8/1999 | Liedberg | 711/156 |
| 6,385,699 B1 | * | 5/2002 | Bozman et al. | 711/133 |
| 6,408,360 B1 | * | 6/2002 | Chamberlain et al. | 711/124 |
| 6,425,057 B1 | * | 7/2002 | Cherkasova et al. | 711/134 |
| 6,826,599 B1 | * | 11/2004 | Shaffer et al. | 709/213 |

OTHER PUBLICATIONS

"Persistence Power Report, Distributed Dynamic Caching For Extreme Applications," from www.persistence.com, pp. 1-7.
"Persistence Power Tier," from www.persistence.com/products/powertier.html, pp. 1-6.
"Delivering Value With Cache Synchronization for Cost-Effective Scalability," from www.persistence.com/technology/synchronization.html, pp. 1-7.
"Delivering Value by Optimizing Performance With Transactional Caching," from www.persistence.com/technology/caching.html, pp. 1-7.

* cited by examiner

*Primary Examiner*—Nasser Moazzami
(74) *Attorney, Agent, or Firm*—Myers Bigel Sibley & Sajovec, P.A.

(57) ABSTRACT

Controlling a cache of distributed data is provided by dynamically determining whether and/or where to cache the distributed data based on characteristics of the data, characteristics of the source of the data and characteristics of the cache so as to provide an indication of whether to cache the data. The data may be selectively cached based on the indication.

17 Claims, 6 Drawing Sheets

METHODS, SYSTEMS AND COMPUTER PROGRAM PRODUCTS FOR CONTROLLING CACHING OF DISTRIBUTED DATA

FIELD OF THE INVENTION

The present invention relates to distributed data and more particularly to the caching of distributed data.

BACKGROUND OF THE INVENTION

Caching is a common technique used in applications running on application servers to gain performance and scale while reducing cost of ownership. Caching is well suited for the typical transactional web-based applications because of their high read to write ratios. For example, in an on-line trading application, much more time is spent watching (reading) the prices of stock versus buying or selling stock (writing). When caching is productively employed within an eBusiness application, traffic to costly backend servers, such as database servers or legacy code running on mainframes, may be reduced. Thus, less capacity of such backend servers may be required which may lower the total cost of owning the system.

High volume web applications typically use large clusters of application servers to scale to the response time demands of customers. Caching in large clustered environments can present challenges in keeping cached data consistent. One common method employed by application servers is illustrated in FIG. 1. As seen in FIG. 1, the application servers 10 have corresponding caches 12. Message oriented middleware (MOM) 14 is utilized to replicate cached data and/or data invalidation notification between application server instances 10 in the cluster of application servers. Thus, data from the database 16 may be replicated in the caches 12 of the application servers 10. This replication may be controlled by the MOM 14 utilizing a message network.

Data replication in the caches 12 may be cost effective if the cost to replicate the data, which is usually measured in latency, is known to be more efficient than to recreate the data from the data source of origin. For example, if it takes 250 ms to completely replicate an object containing a companies net worth and it takes 2500 ms to calculate the companies net worth by interacting with backend data management systems, is may be preferable to replicate the net worth object rather than recalculate it. However, during peak times, when application servers are very busy, the busy CPUs and congested network may lead to delays which might cause the total replication of the net worth object to exceed 2500 ms. Typically, however, the decision of whether to replicate (cache) the net worth object or to recalculate it is a static decision and does not depend on a particular situation for replication. Thus, typically, the net worth object would be cached or recalculated independent of the particular timings for replication and/or recalculation.

Another variation of cache distribution is illustrated in FIG. 2. FIG. 2 illustrates off-loading of cache memory data to a disk cache. Thus, as seen in FIG. 2, the caches 12 of the application servers 10 may write cache data to a file system 20 to offload the data to a disk cache. Off-loading cache data to disk may be an effective way of ensuring that the memory-based cache does not exhaust memory. Disk offload can also be used to distribute cache data between the servers 10 in the cluster of application servers if the disk file is stored on a networked file system. As with replication described above, typically, the decision of whether to offload cache data to disk is a static decision and does not depend on a particular situation for data offload.

SUMMARY OF THE INVENTION

Embodiments of the present invention provide for controlling a cache of distributed data by dynamically determining whether and/or where to cache the distributed data based on characteristics of the data, characteristics of the source of the data and characteristics of the cache so as to provide an indication of whether and/or where to cache the data. The data may be selectively cached based on the indication. Moreover, the data ma be cached to memory, disk, replicated within a cluster, and/or cached in other devices/locations, based on the indication.

In particular embodiments of the present invention, the characteristics of the data include how often the data is accessed. The characteristics of the source of the data may include how long it takes to recompute the data and/or how long it takes to replicate the data. The characteristics of the cache may include how long it takes to retrieve a cached item.

In still further embodiments of the present invention, dynamically determining whether and/or where to cache the distributed data includes determining a predicted maximum number of cache accesses, determining a predicted maximum time consumed by processing cache hits corresponding to a cache entry corresponding to the distributed data, determining a time (r) to replicate the distributed data and determining time (c) to generate the distributed data. The indication is set to indicate caching the distributed data if the sum of the time to generate the distributed data, the time to replicate the distributed data and the predicted maximum time consumed by processing cache hits is less than the product of the predicted maximum number of cache accesses and the time to generate the distributed data.

Additionally, a time to live (TTL) for the cache entry corresponding to the distributed data, a time (h) to process a cache hit corresponding to the distributed data and a predicted frequency (f) of cache accesses for the cache entry corresponding to the distributed data may also be determined. In such cases, determining a predicted maximum number of cache access may be provided by determining TTL*f. Also, determining a predicted maximum time consumed by processing cache hits corresponding to a cache entry corresponding to the distributed data may be provided by determining h*(TTL*f)−1.

In further embodiments of the present invention, the cache includes a disk cache and caching the data includes offloading cached memory contents to the disk cache.

In still other embodiments of the present invention, determining a predicted maximum number of cache accesses includes monitoring cache accesses to determine an update rate of cache entries corresponding to the distributed data. Determining a time (h) to process a cache hit corresponding to the distributed data may include monitoring cache accesses to determine the time (h). Determining a time (r) to replicate the distributed data may include monitoring data replication operations to determine the time (r). Finally, determining time (c) to generate the distributed data may include monitoring generation of the distributed data to determine the time (c).

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
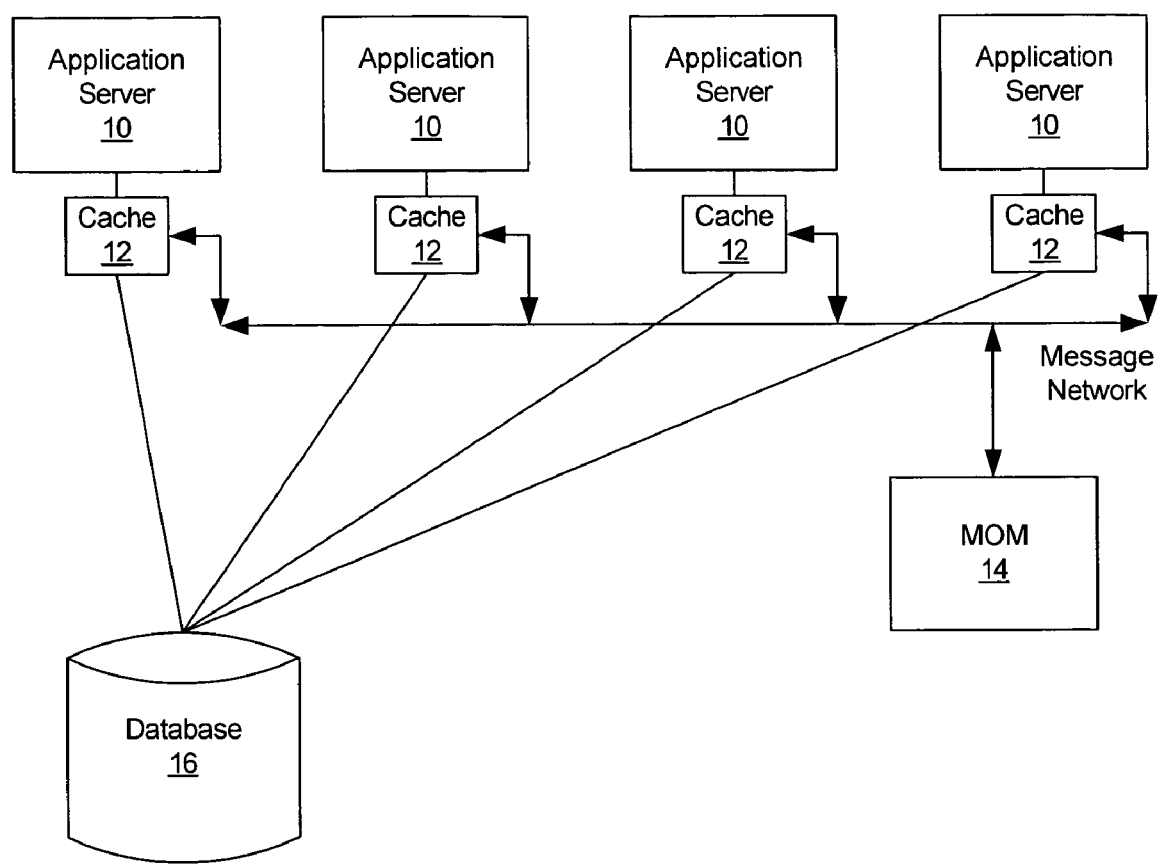
FIG. 1 is a block diagram of a conventional application server cluster utilizing data replication.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
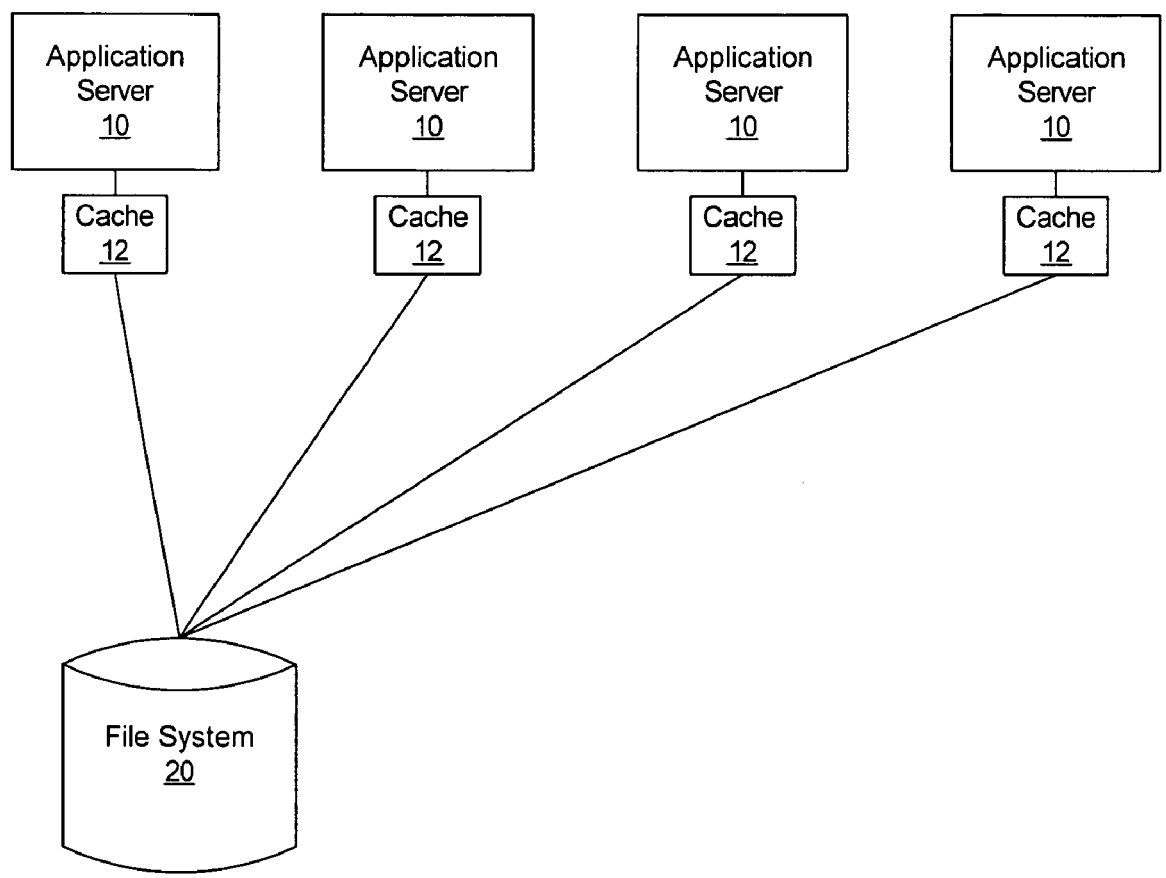
FIG. 2 is a block diagram of a conventional application server cluster utilizing disk caching.

Various embodiments of the present invention will now be described with reference to the figures. Embodiments of the present invention may be incorporated into the conventional systems for replication and/or offloading of data discussed above with reference to FIGS. 1 and 2. However, embodiments of the present invention may also be utilized in other systems and with other configurations where decisions on whether to cache data may be made based on an assessment of the efficiency of caching the data. Thus, the present invention should not be construed as limited to use in systems such as those illustrated in FIGS. 1 and 2 but may be used in any system utilizing distributed data. As used herein, distributed data is data that may either be cached for future use or re-generated for future. Embodiments of the present invention may dynamically determine if caching or re-generation may be more efficient and, thereby, control whether and/or where to cache (in a memory cache and/or disk cache) the data.

Figure 3:
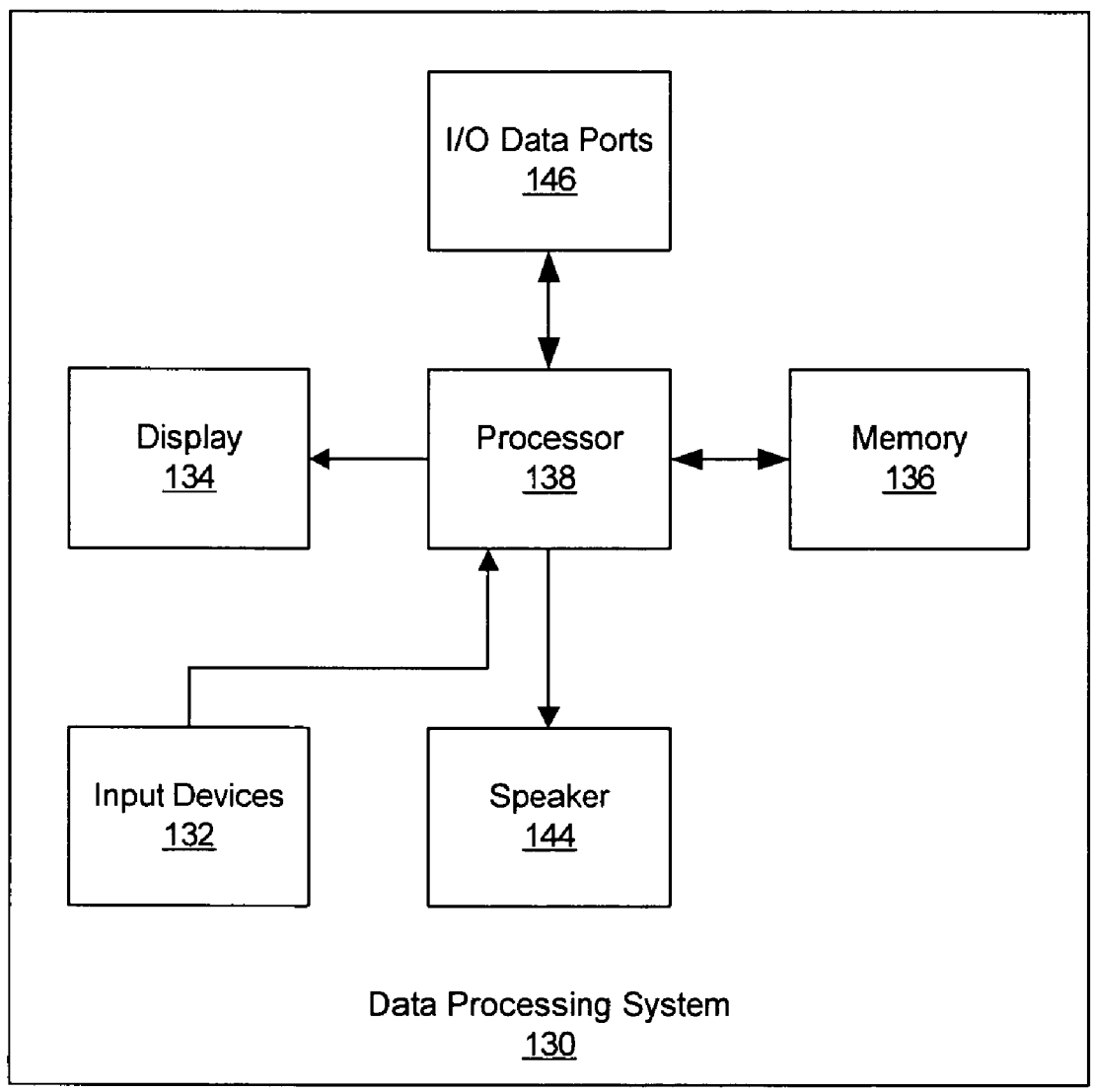
FIG. 3 is a block diagram of a data processing system suitable for use in cache controlling systems according to embodiments of the present invention.

FIG. 3 illustrates an exemplary embodiment of a data processing system 130 suitable for providing cache control in accordance with embodiments of the present invention. Such a data processing system may, for example, be provided as the MOM 14 and/or application servers 10 of FIGS. 1 and 2. The data processing system 130 of FIG. 3 is, thus, illustrative of data processing systems which may provide cache control, however, embodiments of the present invention may be provided by any type of data processing system capable of carrying out the operations described herein.

The data processing system 130 may include input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 4:
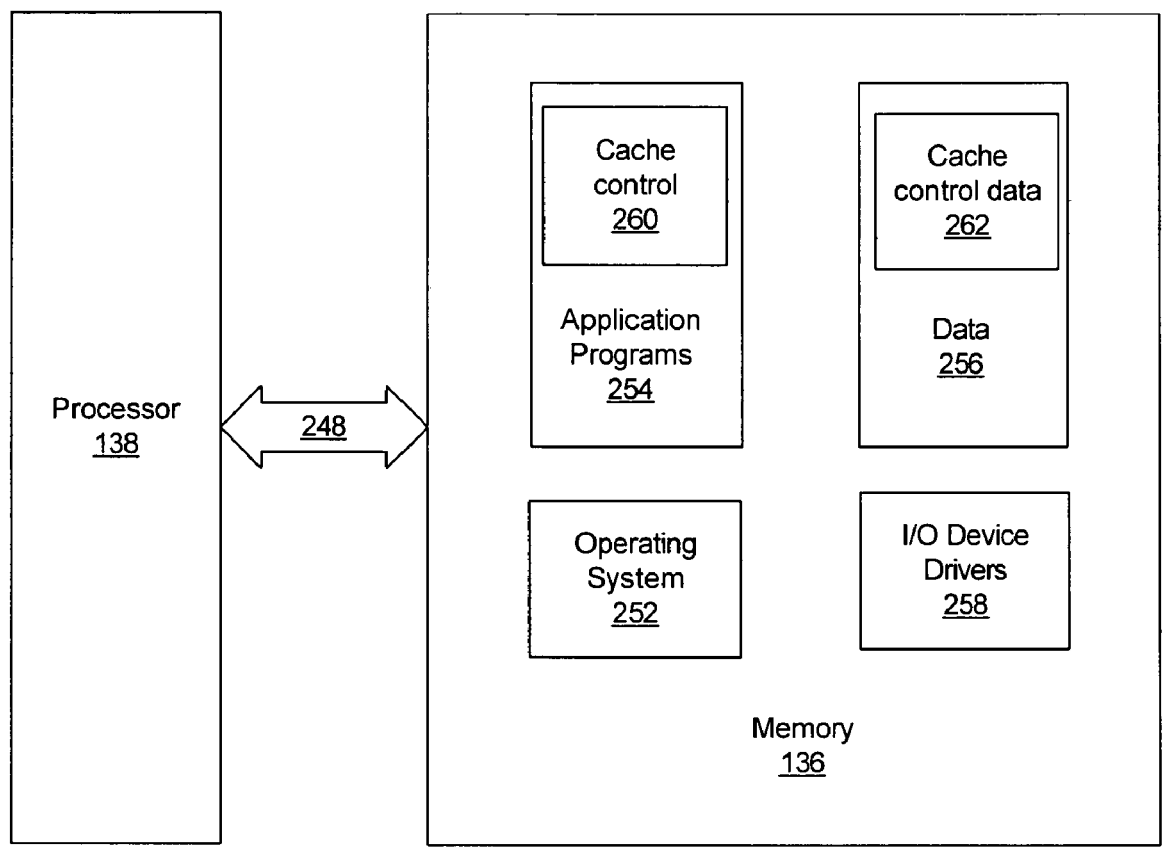
FIG. 4 is a more detailed block diagram of a system incorporating cache controlling according to embodiments of the present invention.

FIG. 4 is a block diagram of data processing systems that illustrate systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 4, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 4, the application programs 254 may include a cache control module 260. The cache control module 260 may carry out the operations described herein for determining whether to cache data or not and/or where to cache. The data portion 256 of memory 136, as shown in the embodiments of FIG. 4, may, optionally, include cache control data 262. The cache control data 262 may be utilized by the cache control module 260 to determine whether caching or re-generation of the data is more efficient and, thereby, dynamically control the caching decision. The cache control data 262 also may be utilized by the cache control module 260 to determine where to cache (for example, to memory, disk, or replicated in the cluster)

While the present invention is illustrated, for example, with reference to the cache control module 260 being an application program in FIG. 4, as will be appreciated by those of skill in the art, other configurations may also be utilized while still benefitting from the teachings of the present invention. For example, the cache control module 260 may also be incorporated into the operating system 252, the I/O device drivers 258 or other such logical division of the data processing system 130. Thus, the present invention should not be construed as limited to the configuration of FIG. 4 but is intended to encompass any configuration capable of carrying out the operations described herein.

Figure 5:
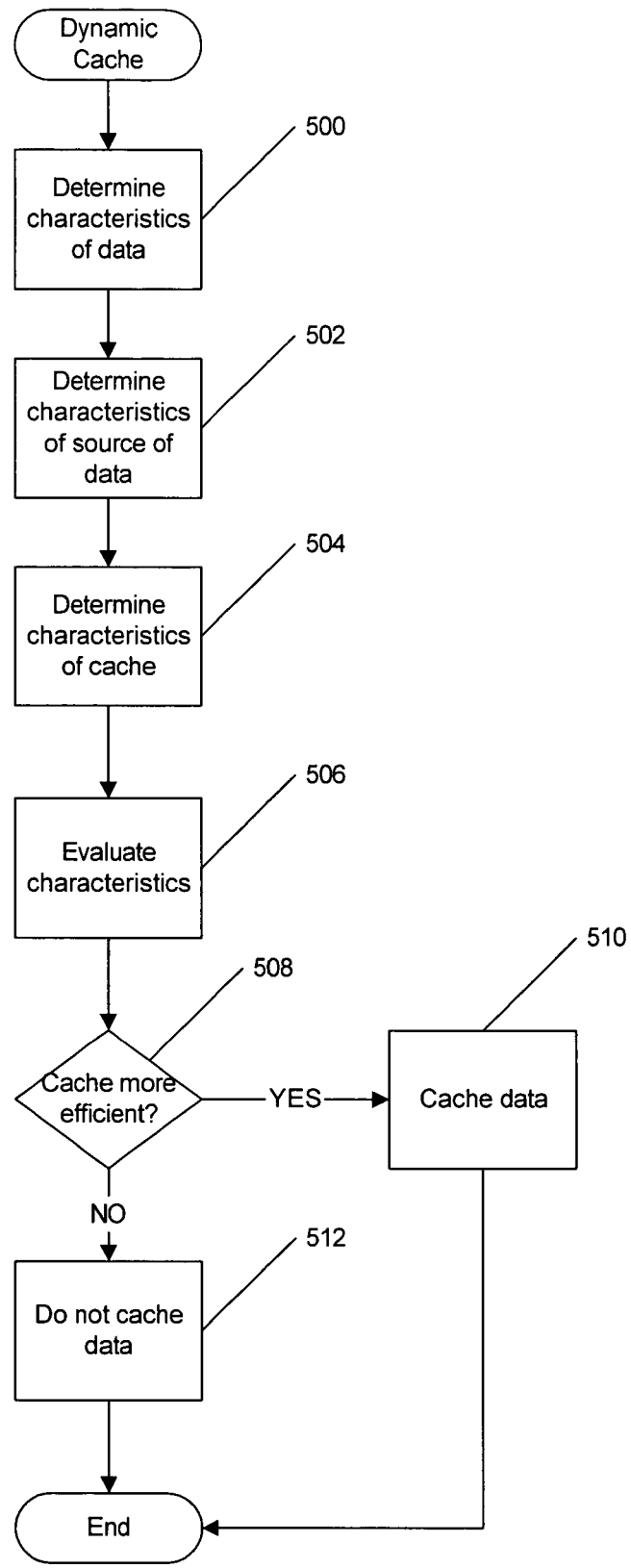
FIG. 5 is a flowchart illustrating operations for cache control according to embodiments of the present invention.

Operations according to embodiments of the present invention will now be described with reference to the flowcharts of FIGS. 5 and 6. The operations of FIGS. 5 and/or 6 may be carried out, for example, by the cache control module 260 of FIG. 4. As seen in FIG. 5, characteristics of the data to be cached are determined (block 500). Such characteristics may include, for example, the time to live (TTL) of the data and the frequency (f) with which the data is accessed Such characteristics may be dynamically determined or pre-established. In particular embodiments of the present invention, the TTL information may be computed directly based on user input and/or determined by observing and recording (monitoring) the update rate for a particular cache entry. The frequency of cache access could be calculated and/or sampled based on the access pattern for a particular item or type of cache data.

Characteristics of the source of the data to be cached are also determined (block 502). Such characteristics may include, for example, how long it takes to recompute the data. Such a determination may be dynamically made based on monitoring of the generation of the data. Characteristics of the cache are also determined (block 504). Such characteristics may include, for example, how long it takes to replicate/offload the data and/or how long it takes to retrieve a cached item. These characteristics may be determined, for example, by sampling or otherwise monitoring the system as replication/offload of data and/or cache retrievals are performed so that the characteristics may be updated as conditions change.

The determined characteristics are evaluated (block 506) to determine if caching the data is more efficient than re-generating the data, and if so, where to cache the data. For example, the decision to cache or not to cache may utilize the system-load statistics, frequency and response times to determine the configuration of a distributed cache. Based on the evaluation of the information described above, the decision may be made. For example, if the data can quickly be computed by a single node in the cluster, then it might be more efficient not to distribute the data. If the system is experiencing peak loads or if the data being replicated is large, causing delays in replication, replication might not be the most effective way to process the data. A similar determination could be made with respect to offloading the data to a disk cache. Also, if the data is updated frequently then the regeneration of the data may be more effective than distributing the data. Thus, replication may not be productive. Finally, retrieving data from the cache, typically, takes time to calculate a cache key as well as physically retrieve the item from the cache. Thus, if the cache latency is too great it may be more efficient to distribute the data through caching.

If caching is more efficient (block 508) the data is cached (block 510), for example, by setting an indication that the data should be cached and using the indication to cache the data using conventional techniques. If caching is not more efficient (block 508) the data is not cached (block 512), for example, by setting the indication that the data should not be cached and using the indication to not cache the data, using conventional techniques.

Figure 6:
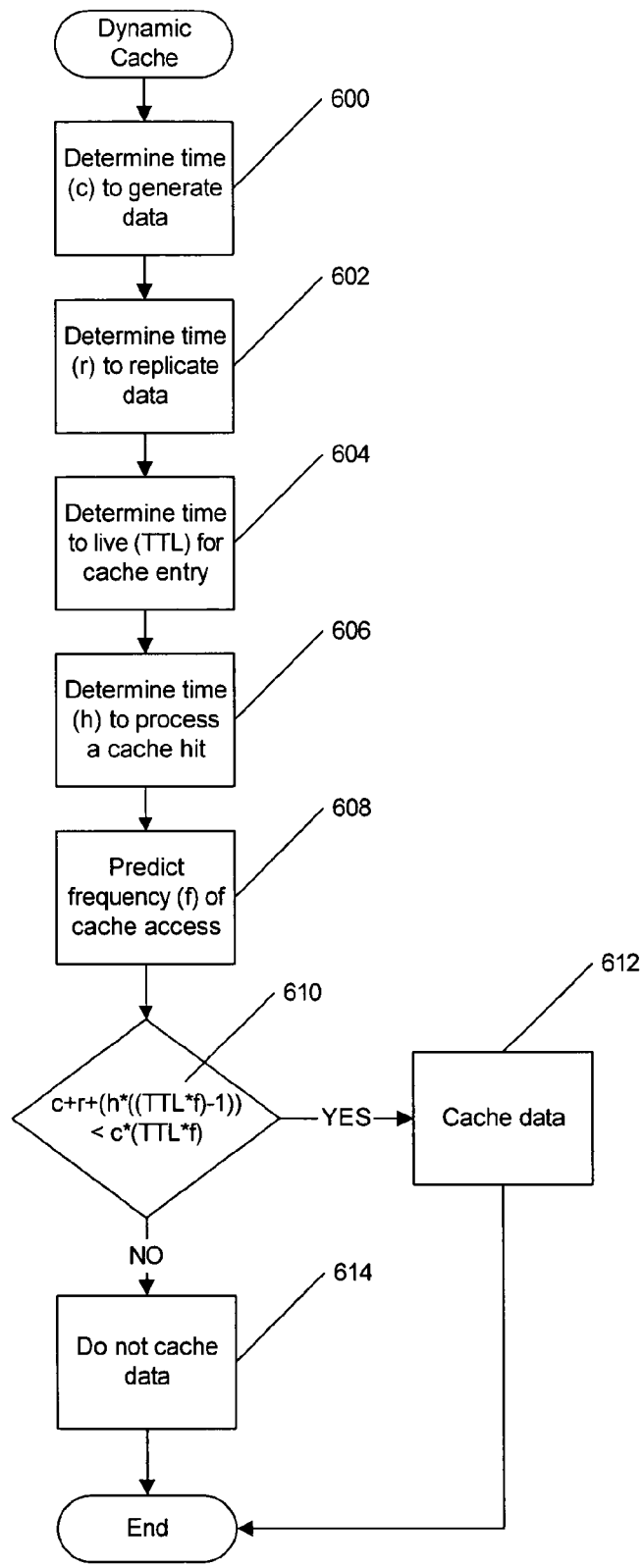
FIG. 6 is a flowchart illustrating operations for cache control according to further embodiments of the present invention.

FIG. 6 illustrates operations for controlling a cache according to further embodiments of the present invention such as may be carried out, for example, by the cache control module 260 of FIG. 4. As seen in FIG. 6, a predicted time (c) it takes to generate the data to be cached is determined (block 600). Such a predication may be made, for example, by monitoring the generation of the data and utilizing that information to determine the predicted time (c). Other techniques for determining the time (c) may also be utilized. This data may, for example, be stored as the cache control data 262 of FIG. 4.

A predicted time (r) to replicate and/or offload the data to disk is also determined (block 602). Such a predication may be made, for example, by monitoring the replication and/or offloading of the data and utilizing that information to determine the predicted time (r). Other techniques for determining the time (r) may also be utilized. This data may, for example, be stored as the cache control data 262 of FIG. 4. Accordingly, a determination whether and/or where to cache may be made.

A time to live (TTL) of the data is also determined (block 604). Such a determination may be made, for example, by computing the TTL directly based on user input and/or by monitoring the update rate for a particular cache entry. Thus, a projected TTL may be determined, for example, utilizing the average update timing for a cache entry corresponding to the data. Other techniques for determining TTL for a cache entry may also be utilized. This data may, for example, be stored as the cache control data 262 of FIG. 4.

A time (h) to process a cache hit is also determined (block 606). Such a determination may be made, for example, by monitoring cache access times. The monitored cache access times could be access times in general or access times for a cache entry corresponding to the data. Thus, a projected time (h) may be determined, for example, utilizing the average cache access time or the actual or average cache access time for a cache entry corresponding to the data. Other techniques for determining the time (h) may also be utilized. This data may, for example, be stored as the cache control data 262 of FIG. 4.

A frequency (f) of cache accesses is also determined (block 608). Such a determination may be made, for example, by calculation and/or sampling based on the access pattern to the particular item or type of cached data. Other techniques for determining the time (f) may also be utilized. This data may, for example, be stored as the cache control data 262 of FIG. 4.

The values determined above are used to determine whether to cache the data, replicate the cached data in the cluster, or store the cached data to a disk. In particular, a determination is made as to whether $c+r+(h*((TTL*f)-1))$ is less than $c*(TTL*f)$ (block 610). This determination may be made repeatedly using the value of r that is equal to the time to retrieve the data from the local cache, the time to replicate the data in the cluster, or the time to offload the cache item to disk, to thereby determine whether and/or where to cache. If so, the data is cached (block 612) and if not, the data is not cached (block 614). As further explanation, the determination of the product of the frequency of access and the time to live of the cache entry (TTL*f) determines a predicted number of cache accesses during the life of a cache entry. The total time to process cache hits is given by $h*((TTL*f)-1)$. Thus, the total time to obtain content from the cache is provided by the sum of the time to generate the data, the time to replicate the data and the time to process cache hits, which may be expressed as $c+r+(h*((TTL*f)-1))$.

The total time to regenerate the data if it is not cached is provided by the product of the time to generate the data and the predicted number of accesses of the data, which is $c*(TTL*f)$. If the total time to regenerate the data is greater than the total time to obtain the content from the cache, then the data may be more efficiently cached. Otherwise, the data may be more efficiently regenerated.

As an example, if for data TTL is 10 seconds, the time (c) to generate the data is 0.3 seconds, the frequency (f) of access is 3 hits per second, the time (r) to replicate or offload the data os 1 second and the time (h) to process a cache hit is 0.1 seconds, then $c+r+(h*((TTL*f)-1))$ is 4.2. The value for $c*(TTL*f)$ is 9. Accordingly, the data would be cached.

The flowcharts and block diagrams of FIGS. 1 through 6 illustrate the architecture, functionality, and operation of possible implementations of systems, methods and computer program products for autonomic cache control according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

The invention claimed is:

1. A method of controlling a cache of distributed data, comprising:
    dynamically determining whether and/or where to cache the distributed data based on characteristics of the data, characteristics of the source of the data and characteristics of the cache so as to provide an indication of whether to cache the data; and
    selectively caching the data based on the indication, wherein dynamically determining whether and/or where to cache the distributed data, comprises:
    determining a predicted maximum number of cache accesses;
    determining a predicted maximum time consumed by processing cache hits corresponding to a cache entry corresponding to the distributed data;
    determining a time (r) to replicate the distributed data;
    determining time (c) to generate the distributed data; and
    setting the indication to indicate caching the distributed data if the sum of the time to generate the distributed data, the time to replicate the distributed data and the predicted maximum time consumed by processing cache hits is less than the product of the predicted maximum number of cache accesses and the time to generate the distributed data.

2. The method of claim 1, wherein the characteristics of the data comprise how often the data is accessed.

3. The method of claim 1, wherein the characteristics of the source of the data comprise how long it takes to recompute the data and/or how long it takes to replicate the data.

4. The method of claim 1, further comprising:
    determining a time to live (TTL) for the cache entry corresponding to the distributed data;
    determining a time (h) to process a cache hit corresponding to the distributed data;
    determining a predicted frequency (f) of cache accesses for the cache entry corresponding to the distributed data;
    wherein determining a predicted maximum number of cache access comprises determining TTL*f; and
    wherein determining a predicted maximum time consumed by processing cache hits corresponding to a cache entry corresponding to the distributed data comprises determining h*(TTL*f)−1.

5. The method of claim 1, wherein determining a predicted maximum number of cache access comprises monitoring cache accesses to determine an update rate of cache entries corresponding to the distributed data.

6. The method of claim 4, wherein determining a time (h) to process a cache hit corresponding to the distributed data comprises monitoring cache accesses to determine the time (h).

7. The method of claim 1, wherein determining a time (r) to replicate the distributed data comprises monitoring data replication operations to determine the time (r).

8. The method of claim 1, wherein determining time (c) to generate the distributed data comprises monitoring generation of the distributed data to determine the time (c).

9. A method of controlling a cache of distributed data, comprising:
dynamically determining whether and/or where to cache the distributed data based on characteristics of the data, characteristics of the source of the data and characteristics of the cache so as to provide an indication of whether to cache the data; and
selectively caching the data based on the indication, wherein setting the indication is repeatedly performed for a time (r) that is equal to a time to retrieve the distributed data from a local cache, a time to replicate the distributed data in a cluster, and a time to offload the distributed data to disk, to thereby determine whether and where to cache the distributed data.

10. The method of claim 9, wherein the characteristics of the cache comprise how long it takes to retrieve a cached item.

11. The method of claim 9, wherein the cache comprises a disk cache and wherein caching the data comprises offloading cached memory contents to the disk cache.

12. A system for controlling a cache of distributed data, comprising:
means for dynamically determining whether and/or where to cache the distributed data based on characteristics of the data, characteristics of the source of the data and characteristics of the cache so as to provide an indication of whether to cache the data; and
means for selectively caching the data based on the indication, wherein the means for dynamically determining whether and/or where to cache the distributed data, comprises:
means for determining a predicted maximum number of cache accesses;
means for determining a predicted maximum time consumed by processing cache hits corresponding to a cache entry corresponding to the distributed data;
means for determining a time (r) to replicate the distributed data;
means for determining time (c) to generate the distributed data; and
means for setting the indication to indicate caching the distributed data if the sum of the time to generate the distributed data, the time to replicate the distributed data and the predicted maximum time consumed by processing cache hits is less than the product of the predicted maximum number of cache accesses and the time to generate the distributed data.

13. The system of claim 12, further comprising:
means for determining a time to live (TTL) for the cache entry corresponding to the distributed data;
means for determining a time (h) to process a cache hit corresponding to the distributed data;
means for determining a predicted frequency (f) of cache accesses for the cache entry corresponding to the distributed data;
wherein the means for determining a predicted maximum number of cache access comprises means for determining TTL*f; and
wherein the means for determining a predicted maximum time consumed by processing cache hits corresponding to a cache entry corresponding to the distributed data comprises means for determining h*(TTL*f)−1.

14. The system of claim 12, wherein the cache comprises a disk cache and wherein the means for selectively caching the data comprises means for offloading cached memory contents to the disk cache.

15. A computer program product for controlling a cache of distributed data, comprising:
a computer readable medium having computer readable program code embodied therein, the computer readable program code comprising:
computer readable program code configured to dynamically determine whether and/or where to cache the distributed data based on characteristics of the data, characteristics of the source of the data and characteristics of the cache so as to provide an indication of whether to cache the data; and
computer readable program code configured to selectively cache the data based on the indication, wherein the computer readable program code configured to dynamically determine whether and/or where to cache the distributed data, comprises:
computer readable program code configured to determine a predicted maximum number of cache accesses;
computer readable program code configured to determine a predicted maximum time consumed by processing cache hits corresponding to a cache entry corresponding to the distributed data;
computer readable program code configured to determine a time (r) to replicate the distributed data;
computer readable program code configured to determine time (c) to generate the distributed data; and
computer readable program code configured to set the indication to indicate caching the distributed data if the sum of the time to generate the distributed data, the time to replicate the distributed data and the predicted maximum time consumed by processing cache hits is less than the product of the predicted maximum number of cache accesses and the time to generate the distributed data.

16. The computer program product of claim 15, further comprising:
computer readable program code configured to determine a time to live (TTL) for the cache entry corresponding to the distributed data;
computer readable program code configured to determine a time (h) to process a cache hit corresponding to the distributed data;
computer readable program code configured to determine a predicted frequency (f) of cache accesses for the cache entry corresponding to the distributed data;
wherein the computer readable program code configured to determine a predicted maximum number of cache access comprises computer readable program code configured to determine TTL*f; and
wherein the computer readable program code configured to determine a predicted maximum time consumed by processing cache hits corresponding to a cache entry corresponding to the distributed data comprises computer readable program code configured to determine $h*(TTL*f)-1$.

17. The computer program product of claim 15, wherein the cache comprises a disk cache and wherein the computer readable program code configured to selectively cache the data comprises computer readable program code configured to offload cached memory contents to the disk cache.

* * * * *